United States Patent [19]

Jellinek et al.

[11] Patent Number: 4,663,418

[45] Date of Patent: May 5, 1987

[54] NOVEL CALCIUM HYDROXIDE CATALYZED PHENOLIC RESIN BINDER AND METHOD

[75] Inventors: Karl Jellinek, Iserlohn-Letmathe; Rolf Müller; Gerhard Wisomirski, both of Duisburg, all of Fed. Rep. of Germany

[73] Assignee: Rutgerswerke Aktiengesellschaft, Fed. Rep. of Germany

[21] Appl. No.: 815,375

[22] Filed: Dec. 31, 1985

[30] Foreign Application Priority Data

Feb. 8, 1985 [DE] Fed. Rep. of Germany ....... 3504340

[51] Int. Cl.⁴ .......................... C08G 8/08; C08G 8/10; C08G 8/28
[52] U.S. Cl. .................................... 528/140; 428/529; 528/143; 528/490; 524/596; 524/841
[58] Field of Search ....................... 528/140, 143, 490; 524/596, 841

[56] References Cited

U.S. PATENT DOCUMENTS

| | | | |
|---|---|---|---|
| Re. 30,375 | 8/1980 | Deuzeman et al. | 528/140 X |
| 1,111,288 | 9/1914 | Aylsworth | 528/140 X |
| 1,894,088 | 1/1933 | Dent | 528/140 X |
| 2,056,280 | 10/1936 | Kurath et al. | 528/140 X |
| 2,383,430 | 8/1945 | Weltman | 528/140 X |
| 2,758,101 | 8/1956 | Shappell | 528/140 X |
| 3,239,487 | 3/1966 | Dijkstra | 528/140 X |
| 3,432,453 | 3/1969 | Gladney et al. | 528/490 X |
| 3,624,247 | 11/1971 | Gladney et al. | 528/490 X |
| 3,956,204 | 5/1976 | Higginbottom | 528/140 X |
| 3,956,205 | 5/1976 | Higginbottom | 528/140 X |
| 4,028,367 | 6/1977 | Higginbottom | 528/140 X |

Primary Examiner—Howard E. Schain
Attorney, Agent, or Firm—Bierman & Muserlian

[57] ABSTRACT

An improved moisture-stable phenolic resin binder with calcium ions from the catalyst complexed with the phenolic resin and a process for its preparation and laminate boards with the said binder as the binding agent.

7 Claims, No Drawings

NOVEL CALCIUM HYDROXIDE CATALYZED PHENOLIC RESIN BINDER AND METHOD

STATE OF THE ART

For certain uses of phenolic resin binders, alkaline earth metal hydroxides, especially calcium hydroxide, have been used as the condensation catalysts to impart better moisture stability. Such catalysts have the advantage over alkali metal hydroxides that they can be precipitated after the condensation is complete by addition of dilute sulfuric acid, carbon dioxide, ammonium sulfate, ammonium phosphate or ammonium carbonate to form the corresponding water-insoluble calcium salts which can then be separated from the aqueous solution to produce almost ash-free resins. The resulting resins possess excellent moisture stability, particularly if small amounts of, e.g. 0.05%, of an aminosilane based on the dry resin are added to the resin.

A serious disadvantage to the production of such resin binders is that insoluble precipitates occur which must be filtered off and this is an expensive step since clogging of the spray nozzles during the processing of the resins will otherwise occur. Moreover, disposal of the phenolic-containing filter cake is expensive and constitutes an environmental problem.

OBJECTS OF THE INVENTION

It is an object of the invention to provide a novel resin binder having excellent moisture stability and free of calcium precipitates and a novel process for the preparation of said binder.

It is another object of the invention to provide novel laminate boards with the resin binder of the invention as the adhesive, especially made of impregnated paper.

These and other objects and advantages of the invention will become obvious from the following detailed description.

THE INVENTION

The novel process of the invention for the preparation of a moisture-stable phenolic resin binder comprises condensing a phenol and formaldehyde in an aqueous media in the presence of calcium hydroxide as catalyst to form a condensation product, adjusting the pH of the product to 7.5 to 11 by addition of a base and adding 0.8 to 2.0 moles of sulfate ions per mole of the calcium ions while maintaining the pH in the range of 7.5 to 11.

In a preferred mode of the process, the pH is adjusted to 8.5 to 10.5 and the sulfate ions are added in the form of sulfuric acid or ammonium sulfate with simultaneous addition of additional base to maintain the pH in the desired range.

Surprisingly, no calcium precipitate is formed in the process of the invention and the resin solution remains substantially clear and depending on the composition, does not change over a period of some hours up to several days. The resin solution can be further processed during this period even after optional dilution with water and/or addition of an aminosilane as an adhesion improving agent.

The avoidance of calcium sulfate precipitation is probably due to the formation of a relatively stable metallorganic complex of the calcium ions with the mono- and poly-nuclear phenols or their methylol compounds. This becomes especially evident when the resin solution is concentrated by evaporation and the resin hardened in the form of a thin film which is a clear, transparent, light-yellow film showing no clouding of any kind due to separated calcium sulfate. The inorganic catalyst component, therefore, has become an integral part of the binder molecules and increases the resin yield. Thereby, without additional cost, the yield of the resin is increased and thereby also a distinct increase of the binder proportion is obtained. The increase in useful resin content is, depending on the catalyst quantity employed, between 1 and 5% by comparison with conventional moisture-stable binders where the catalyst has been removed by precipitation and filtration before use.

The basic phenolic resin of the invention is a condensation product of phenol and formaldehyde in a molar ratio of 1:1.3 to 1:4.0 in aqueous solution. The condensation catalyst is calcium hydroxide which is used in an amount of 0.5 to 10.0 parts by weight, based on the amount of phenol charged. While the moisture stability is impaired by modification of the phenolic resin with urea, it still meets the requirements of the adhesive in most cases, if the quantity of urea does not exceed 100 parts by weight per 100 parts by weight of the phenol employed.

Examples of suitable bases for the process of the invention are ammonia and all basic organic compounds such as methylamine, ethylamine, propylamine, butylamine, dimethylamine, trimethylamine, diethylamine, triethylamine, ethanolamine, diethanolamine or triethanolamine. While the use of alkali hydroxides is possible in principle, it is not advisable since the moisture stability of the fiber products is reduced. The preferred base is ammonia in the form of gas or in aqueous solution.

The addition of ammonia to the aqueous resin solution not only results in any residual amount of free formaldehyde in the resin being bound by formation of hexamethylene tetramine, and also the water dilution and hence the impregnation and storage properties of the resin are thereby generally improved. Ideally in this respect, the resin solution is adjusted to a pH range of from 7.5 to 11.0, preferably 8.5 to 10.5.

For the transformation of the calcium hydroxide contained in the resin into chelated calcium sulfate, ammonium sulfate is preferred in the process. But the sulfate ions required for the transformation can be introduced in a different way such as by addition of ammonium hydrogen sulfate or of dilute sulfuric acid to the resin solution diluted with ammonia. In any case, approximately the stoichiometric quantity of sulfate ions required for binding the calcium ions present in the binder solution is to be added and the deviation from the stoichiometric quantity should not be more than 100% upward or 20% downward.

In the following example there are described several preferred embodiments to illustrate the invention. However, it should be understood that the invention is not intended to be limited to the specific embodiments.

EXAMPLE 100 g of phenol were added to a mixture of 212.8 g of a 45% aqueous formalin solution and 5 g of calcium hydroxide and the mixture was held at 60° C. until a sample cooled to 20° C. remained clear when diluted with distilled water at a ratio of 1:5 and become cloudy at a ratio of 1:10. Then, the mixture was cooled to 10° to 20° C. and a 25% by weight ammonium hydroxide solution was added thereto until the resin solution had a pH of 9.8. 35.7 g of a 25% aqueous solution of ammonium sulfate were then added to the aqueous solution after which the solution was diluted with water to a dry resin content of 40% which was used within 5 hours for the production of resin-impregnated laminate board of paper.

Various modifications of the product and processes of the invention may be made without departing from the spirit or scope thereof and it is to be understood that the invention is intended to be limited only as defined in the appended claims.

What we claim is:

1. A proces for the preparation of a moisture-stable phenolic resin binder comprising condensing a phenol and formaldehyde in an aqueous media in the presence of calcium hydroxide as catalyst to form a condensation product, cooling the reaction mixture after the condensation to 10° to 20° C., adjusting the pH of the reaction mixture to 8.5 to 10.5 by addition of a base and then adding 0.8 to 2.0 moles of sulfate ions per mol of the calcium ions while maintaining the pH in the range of 8.5 to 10.5.

2. The process of claim 1 wherein the molar ratio of phenol to formaldehyde is 1:1.3 to 1:4.0.

3. The process of claim 1 wherein the amount of calcium hydroxide is 0.5 to 10.0% by weight based on the phenolic resin.

4. The process of claim 1 wherein the phenolic resin contains up to 100 parts by weight of urea per 100 parts by weight phenol charged.

5. The process of claim 1 wherein the base added is ammonia.

6. The process of claim 1 wherein the sulfate ions are added in the form of ammonium sulfate.

7. The process of claim 1 wherein the moles of sulfate ions added are 0.8 to 1.2 moles per mole of calcium ions.

* * * * *